United States Patent
Christensen (10) Patent No.: US 9,841,660 B1
(45) Date of Patent: Dec. 12, 2017

(54) OBJECT GUIDE HAVING A VARIABLE MOTION PATH

(71) Applicants: 9. Solutions Technology Co., Limited, Hong Kong (CN); Bo Christensen, Nordborg (DK)

(72) Inventor: Bo Christensen, Nordborg (DK)

(73) Assignees: 9. Solutions Technology Co., Ltd., Hong Kong (HK); Bo Christensen, Nordborg (DK)

(*) Notice: Subject to any disclaimer, the term of this patent is extended or adjusted under 35 U.S.C. 154(b) by 0 days.

(21) Appl. No.: 15/581,146

(22) Filed: Apr. 28, 2017

(51) Int. Cl.
| | |
|---|---|
| G03B 17/56 | (2006.01) |
| F16M 11/04 | (2006.01) |
| F16M 11/08 | (2006.01) |
| F16H 21/44 | (2006.01) |
| F16M 11/18 | (2006.01) |

(52) U.S. Cl.
CPC .......... *G03B 17/561* (2013.01); *F16H 21/44* (2013.01); *F16M 11/043* (2013.01); *F16M 11/045* (2013.01); *F16M 11/08* (2013.01); *F16M 11/18* (2013.01); *F16M 2200/042* (2013.01); *F16M 2200/063* (2013.01); *F16M 2200/066* (2013.01)

(58) Field of Classification Search
None
See application file for complete search history.

(56) References Cited

U.S. PATENT DOCUMENTS

| | | | | |
|---|---|---|---|---|
| 5,441,505 | A * | 8/1995 | Nakamura | F16M 11/08 414/917 |
| 5,825,536 | A * | 10/1998 | Yasunaga | A61B 90/25 248/123.11 |
| 6,045,104 | A * | 4/2000 | Nakamura | F16M 11/10 248/123.11 |
| 2013/0206933 | A1* | 8/2013 | Schutz | F16M 11/2092 248/123.2 |
| 2014/0291457 | A1* | 10/2014 | Rotheisler | F16M 11/2085 248/123.2 |
| 2016/0377224 | A1* | 12/2016 | Vance | G03B 17/561 396/428 |

FOREIGN PATENT DOCUMENTS

WO 2016042044 A1 3/2016

* cited by examiner

*Primary Examiner* — WB Perkey
(74) *Attorney, Agent, or Firm* — Wang Law Firm, Inc.

(57) ABSTRACT

An object guide having a variable motion path includes a connecting seat, a first motion unit, a second motion unit, an adjustment unit and a drive unit. The adjustment unit is disposed on the connecting seat, and the second connecting portion of the first connecting arm and the fourth connecting portion of the second connecting arm are disposed at the same position, the first adjustment portion of the first adjustment arm and the second adjustment portion of the second adjustment arm are also located at the same position and simultaneously moved by the adjustment unit. Therefore, simply adjusting the adjustment unit can simultaneously adjust the first adjustment portion and the second adjustment portion to the straight line position, the outward curvature position, or the inward curvature position, which make the adjustment convenient, and the displacement curvatures for moving the object are asymmetrical.

6 Claims, 10 Drawing Sheets

OBJECT GUIDE HAVING A VARIABLE MOTION PATH

BACKGROUND

Field of the Invention

The present invention relates to an object guide having a variable motion path, and more particularly to an object guide having a variable motion path which is used in combination with a tripod or a stand to provide a variable motion path for a camera.

Related Prior Art

A tripod is used to support a camera or other apparatus. Then, the tripod is developed into an object guide or camera arm capable of guiding the camera to move along a movement shaft, which allows the object to be shot at different side angles or allows the camera to move or sway with respect to the object to be shot.

Figure 1:
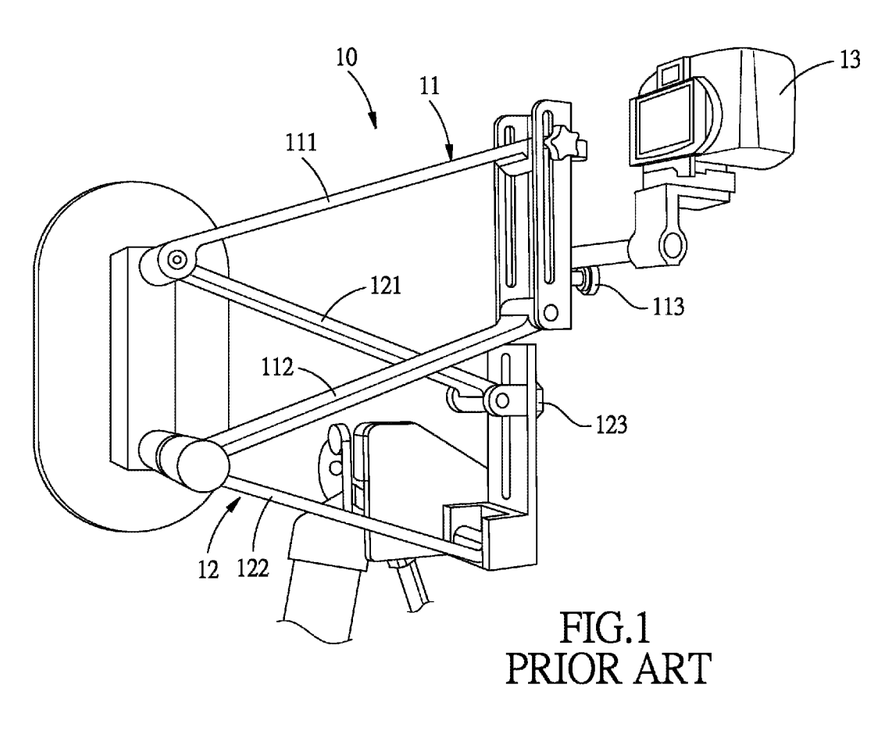
FIG. 1 shows a object guide having a variable motion path which is disclosed in WO 2016042044A1.

FIG. 1 shows an object guide 10 having a variable motion path which is disclosed in WO 2016042044A1, wherein the object guide 10 comprises a first quadrilateral motion structure 11 and a second quadrilateral motion structure 12. Adjusting the position of the first adjustment arm 111 with respect to the first connecting arm 112 of the first quadrilateral motion structure 11 and the position of the second adjustment arm 121 of the second quadrilateral motion structure 12 relative to the second connecting arm 122 can change the motion path of the object 13. However, this object guide still has the following disadvantages:

First of all, inconvenient adjustment: during adjustment of the motion path of the object guide 10, the adjustment unit 113 of the first quadrilateral motion structure 11 has to be unscrewed, moved and then screwed tight. Meanwhile, the adjustment unit 123 of the second quadrilateral motion structure 12 also needs to be unscrewed, moved and then screwed tight. Therefore, the adjustment is inconvenient. Besides, during the adjustment, the user has to move to the position in front left or front right of the object guide 10 in order to adjust the motion path since the object guide 10 cannot be adjusted at the original shooting position (namely behind the object guide 10), which further makes the adjustment inconvenient.

On the other hand, asymmetrical displacement curvatures: during adjustment of the inward or outward curvature path of the object guide 10, the user has to adjust the adjustment unit 113 of the first quadrilateral motion structure 11 and the adjustment unit 123 of the second quadrilateral motion structure 12 both have to be adjusted, however, it cannot guarantee that the two adjustment mounts are equal, which results in the disadvantage of asymmetrical displacement curvatures of the object 13, and consequently affects the shooting quality.

The present invention has arisen to mitigate and/or obviate the afore-described disadvantages.

SUMMARY

One objective of the present invention is to provide an object guide having a variable motion path, which makes the adjustment convenient, and the displacement curvatures for moving the object are asymmetrical.

To achieve the above objective, an object guide having a variable motion path in accordance with the present invention comprises:

a connecting seat including a pivoting portion and a displacement slot;

a first motion unit including a stationary seat, a first connecting arm and a first adjustment arm, the stationary seat including a first assembling portion and a second assembling portion, the first connecting arm being pivotally between the first assembling portion and the pivoting portion, the first adjustment arm including a first pivoting portion pivotally connected to the second assembling portion, and a first adjustment portion movably disposed in the displacement slot, wherein the first adjustment portion is movable among a straight line position, an outward curvature position and an inward curvature position;

a second motion unit including a carrying seat, a second connecting arm and a second adjustment arm, wherein the carrying seat includes a third assembling portion and a fourth assembling portion, the second connecting arm is pivotally connected between the third assembling portion and the second connecting portion, the second connecting arm and the first connecting arm rotate in opposite directions, the second adjustment arm includes a second pivoting portion pivotally connected to the fourth assembling portion, and a second adjustment portion pivotally connected to the first adjustment portion, the second adjustment portion and the first adjustment portion rotate in opposite directions, so that the second adjustment portion is able to move along with the first adjustment portion among the straight line position, the outward curvature position and the inward curvature position; and an adjustment unit connected to the displacement slot of the connecting seat, the first adjustment portion of the first adjustment arm and the second adjustment portion of the second adjustment arm, to adjust positions of the first and second adjustment portions and to fix the first and second adjustment portions after adjustment.

Preferably, the displacement slot is arc-shaped.

Preferably, the adjustment unit further includes a fastening seat, a connecting shaft and a rotary member, the fastening seat includes an extension portion inserted in the displacement slot of the connecting seat, and a seat portion connected to the extension portion and pressed against one edge of the displacement slot, the connecting shaft is inserted in the fastening seat and includes a threaded hole, and is provided for pivotal mounting of the first adjustment portion of the first adjustment arm and the second adjustment portion of the second adjustment arm, the rotary member includes a threaded shaft inserted in the displacement slot and screwed in the threaded hole, a shoulder portion connected to the threaded shaft and pressed against another opposite edge of the displacement slot, and a rotary handle connected to the shoulder portion.

Preferably, the first connecting arm includes a first connecting portion pivotally connected to the first assembling portion, and a second connecting portion pivotally connected to the pivoting portion, and the second connecting arm includes a third connecting portion pivotally connected to the third assembling portion, and a fourth connecting portion pivotally connected to the second connecting portion.

Preferably, a drive unit is disposed on the connecting seat, and includes a drive shaft for connecting the second connecting portion of the first connecting arm and the fourth connecting portion of the second connecting arm.

Preferably, when the first adjustment portion and the second adjustment portion are in the straight line position, a distance between the first connecting portion of the first connecting arm and the first pivoting portion of the first adjustment arm is equal to a distance between the second connecting portion of the first connecting arm and the first adjustment portion of the first adjustment arm, and a distance between the third connecting portion of the second connecting arm and the second pivoting portion of the second adjustment arm is equal to a distance between the fourth connecting portion of the second connecting arm and the second adjustment portion of the second adjustment arm; when the first adjustment portion of the first adjustment arm and the second adjustment portion of the second adjustment arm are in the outward curvature position, the distance between the first connecting portion of the first connecting arm and the first pivoting portion of the first adjustment arm is smaller than the distance between the second connecting portion of the first connecting arm and the first adjustment portion of the first adjustment arm, and the distance between the third connecting portion of the second connecting arm and the second pivoting portion of the second adjustment arm is smaller than the distance between the fourth connecting portion of the second connecting arm and the second adjustment portion of the second adjustment arm; when the first adjustment portion of the first adjustment arm and the second adjustment portion of the second adjustment arm are in the inward curvature position, the distance between the first connecting portion of the first connecting arm and the first pivoting portion of the first adjustment arm is greater than the distance between the second connecting portion of the first connecting arm and the first adjustment portion of the first adjustment arm, and the distance between the third connecting portion of the second connecting arm and the second pivoting portion of the second adjustment arm is greater than the distance between the fourth connecting portion of the second connecting arm and the second adjustment portion of the second adjustment arm.

The adjustment unit is disposed on the connecting seat. Simply adjusting the adjustment unit can simultaneously adjust the first adjustment portion of the first adjustment arm and the second adjustment portion of the second adjustment arm to the straight line position, the outward curvature position, or the inward curvature position, which make the adjustment convenient, and the displacement curvatures for moving the object are asymmetrical.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Referring to FIGS. 2-5, an object guide having a variable motion path in accordance with the preferred embodiment of the present invention comprises: a connecting seat 20, a first motion unit 30, a second motion unit 40, an adjustment unit 50 and a drive unit 60.

Figure 2:
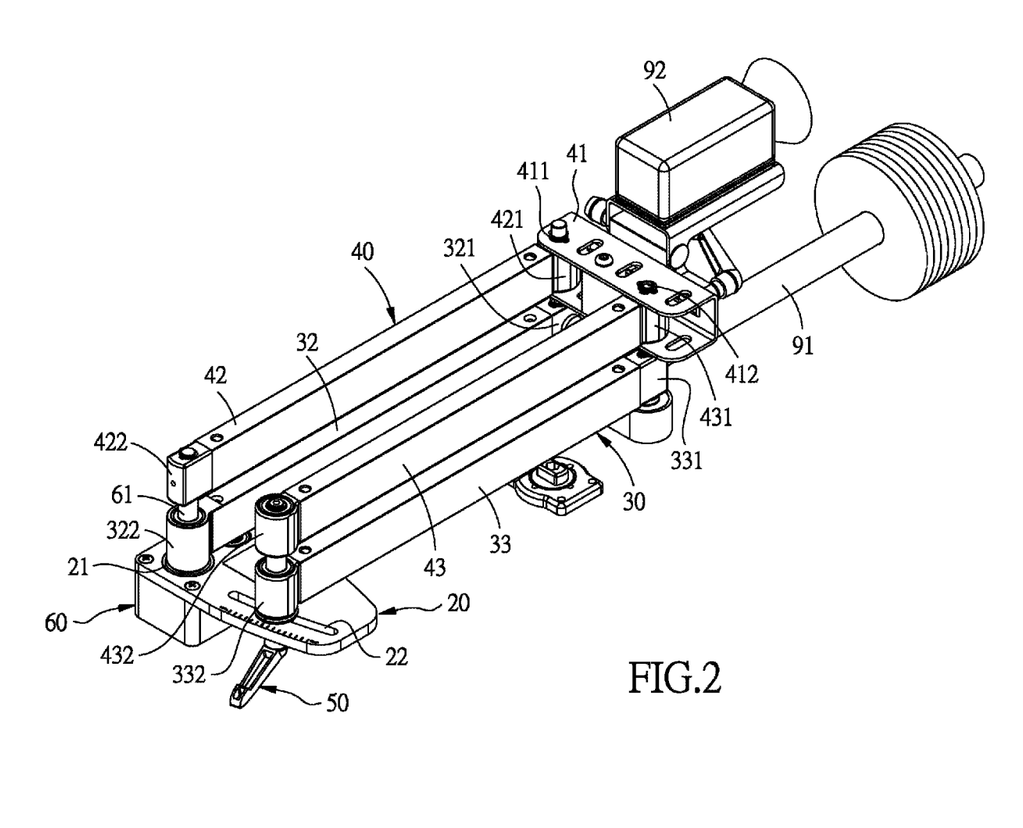
FIG. 2 is a perspective view of an object guide having a variable motion path in accordance with the preferred embodiment of the present invention.
Figure 3:
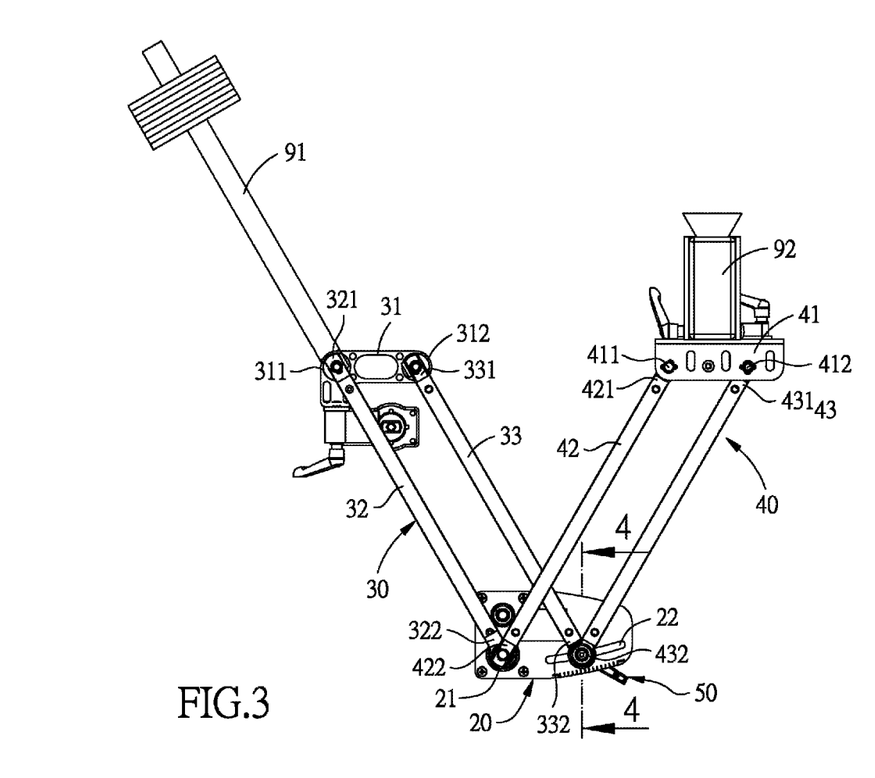
FIG. 3 is a top view of the object guide having a variable motion path in accordance with the preferred embodiment of the present invention.

The connecting seat 20 includes a pivoting portion 21 and a displacement slot 22. In this embodiment, the displacement slot 22 is arc-shaped, and a scale is arranged along the edge of the displacement slot 22.

Figure 7A:
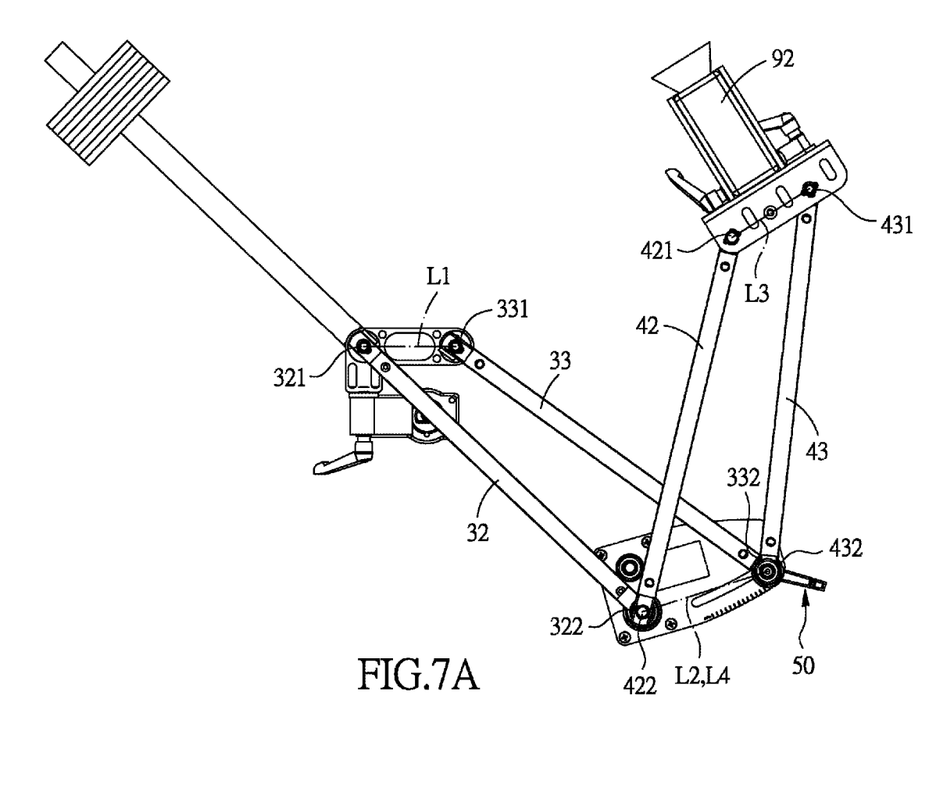
FIG. 7A is a top view of the invention, showing that the first adjustment portion of the first adjustment arm and the second adjustment portion of the second adjustment arm are in the outward curvature position.
Figure 8A:
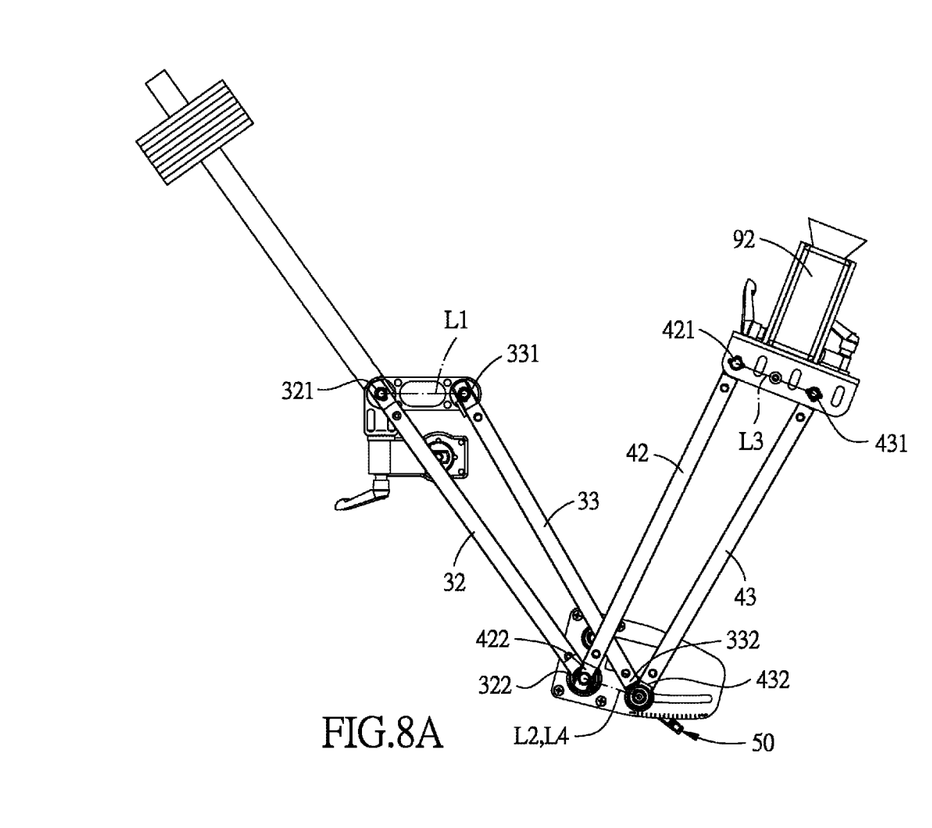
FIG. 8A is a top view of the invention, showing that the first adjustment portion of the first adjustment arm and the second adjustment portion of the second adjustment arm are in the inward curvature position.

The first motion unit 30 includes a stationary seat 31, a first connecting arm 32 and a first adjustment arm 33. The stationary seat 31 is fixed to a fixed object, such as a tripod or stand, and includes a first assembling portion 311 and a second assembling portion 312. The stationary seat 31 is further provided with a counterweight 91 for balance. The first connecting arm 32 is pivotally between the first assembling portion 311 of the stationary seat 31 and the pivoting portion 21 of the connecting seat 20. In this embodiment, the first connecting arm 32 includes a first connecting portion 321 pivotally connected to the first assembling portion 311, and a second connecting portion 322 pivotally connected to the pivoting portion 21. The first adjustment arm 33 includes a first pivoting portion 331 pivotally connected to the second assembling portion 312 of the stationary seat 31, and a first adjustment portion 332 movably disposed in the displacement slot 22 of the connecting seat 20. The first adjustment portion 332 is movable among a straight line position (as shown in FIG. 3), an outward curvature position (as shown in FIG. 7A) and an inward curvature position (as shown in FIG. 8A).

The second motion unit 40 includes a carrying seat 41, a second connecting arm 42 and a second adjustment arm 43. The carrying seat 41 serves to carry an object 92 such as a camera or video camera, and includes a third assembling portion 411 and a fourth assembling portion 412. The second connecting arm 42 is pivotally connected between the third assembling portion 411 of the carrying seat 41 and the second connecting portion 322 of the first connecting arm 32, and rotates in a direction opposite to that of the first connecting arm 32. In this embodiment, the second connecting arm 42 includes a third connecting portion 421 pivotally connected to the third assembling portion 411, and a fourth connecting portion 422 pivotally connected to the second connecting portion 322. The second adjustment arm 43 includes a second pivoting portion 431 pivotally connected to the fourth assembling portion 412 of the carrying seat 41, and a second adjustment portion 432 pivotally connected to the first adjustment portion 332. The second adjustment portion 432 and the first adjustment portion 332 rotate in opposite directions, so that the second adjustment portion 432 can move along with the first adjustment portion 332 among the straight line position, the outward curvature position and the inward curvature position.

Figure 4:
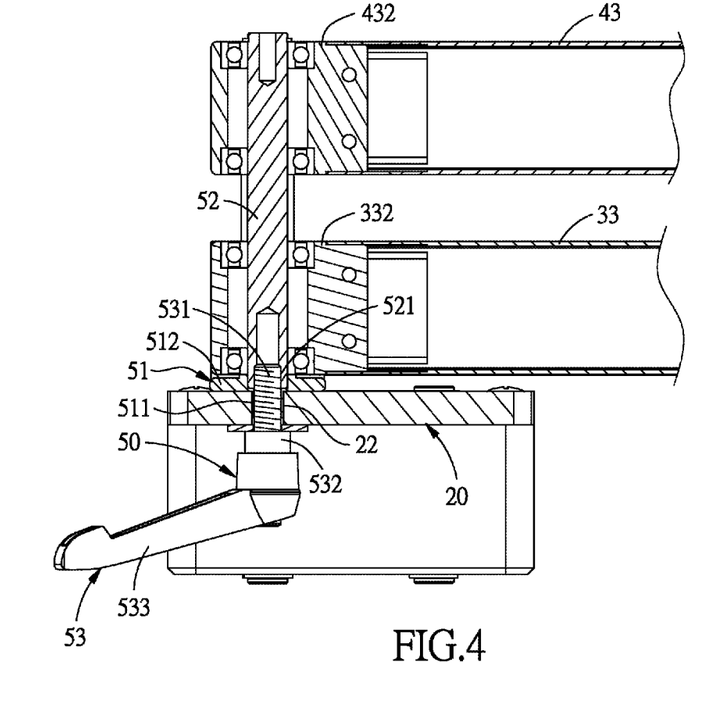
FIG. 4 is a cross sectional view taken along the line 4-4 of FIG. 3, showing that the adjustment unit is screwed tight.
Figure 5:
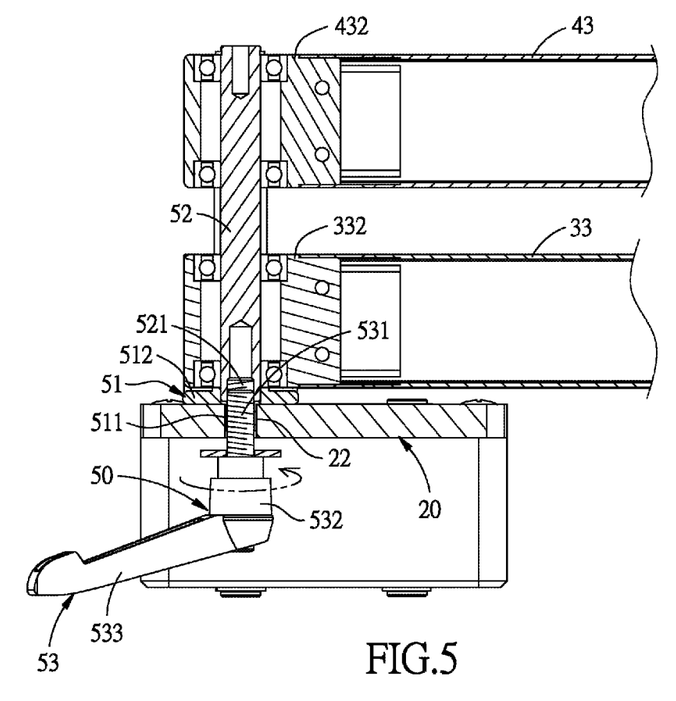
FIG. 5 is a cross sectional view taken along the line 4-4 of FIG. 3, showing that the adjustment unit is loosened.

The adjustment unit 50 is connected to the displacement slot 22 of the connecting seat 20, the first adjustment portion 332 of the first adjustment arm 33 and the second adjustment portion 432 of the second adjustment arm 43, to adjust the positions of the first and second adjustment portions 332, 432 and fix the first and second adjustment portions 332, 432 after adjustment. In this embodiment, the adjustment unit 50 includes a fastening seat 51, a connecting shaft 52 and a rotary member 53. The fastening seat 51 includes an extension portion 511 inserted in the displacement slot 22 of the connecting seat 20, and a seat portion 512 connected to the extension portion 511 and pressed against one edge of the displacement slot 22. The connecting shaft 52 is inserted in the fastening seat 51 and includes a threaded hole 521, and is provided for pivotal mounting of the first adjustment portion 332 of the first adjustment arm 33 and the second adjustment portion 432 of the second adjustment arm 43. The rotary member 53 includes a threaded shaft 531 inserted in the displacement slot 22 and screwed in the threaded hole 521, a shoulder portion 532 connected to the threaded shaft 531 and pressed against another opposite edge of the displacement slot 22, and a rotary handle 533 connected to the shoulder portion 532 and to be pulled by a user.

The drive unit 60 is disposed on the connecting seat 20, and includes a drive shaft 61 for connecting the second connecting portion 322 of the first connecting arm 32 and the fourth connecting portion 422 of the second connecting arm 42. The drive unit 60 drives the first connecting arm 32 and the second connecting arm 42 to rotate in opposite directions around the drive shaft 61. Since the drive unit 60 is a conventional structure, and the method of driving the first connecting arm 32 and the second connecting arm 42 to rotate in opposite directions is also a known art and is not the key point of the present invention, the details of the related structure and operation are omitted. In other embodiments, without the use of the drive unit 60, the first connecting arm 32 and the second connecting arm 42 can also be manually operated to rotate in opposite directions.

What mentioned above are the structural relations of the main components of the embodiment, and the operation and function of the invention are explained as follows:

As shown in FIG. 4, when the adjustment unit 50 is adjusted to the locking position, the seat portion 512 of the fastening seat 51 and the shoulder portion 532 of the rotary member 53 are pressed at two opposite sides of the displacement slot 22 of the connecting seat 20, so as to fix the adjustment unit 50 to the connecting seat 20. As shown in FIGS. 4 and 5, when want to adjust the first adjustment portion 332 of the first adjustment arm 33 and the second adjustment portion 432 of the second adjustment arm 43 to the straight line position (as shown in FIG. 3), the outward curvature position (as shown in FIG. 7A), or the inward curvature position (as shown in FIG. 8A), the user can pull the rotary handle 533 of the rotary member 53 to release the seat portion 512 of the fastening seat 51 and the shoulder portion 532 of the rotary member 53 from the edges of the displacement slot 22 of the connecting seat 20, and then the first adjustment portion 332 of the first adjustment arm 33 and the second adjustment portion 432 of the second adjustment arm 43 can be moved to the straight line position, the outward curvature position or the inward curvature position.

Figure 6:
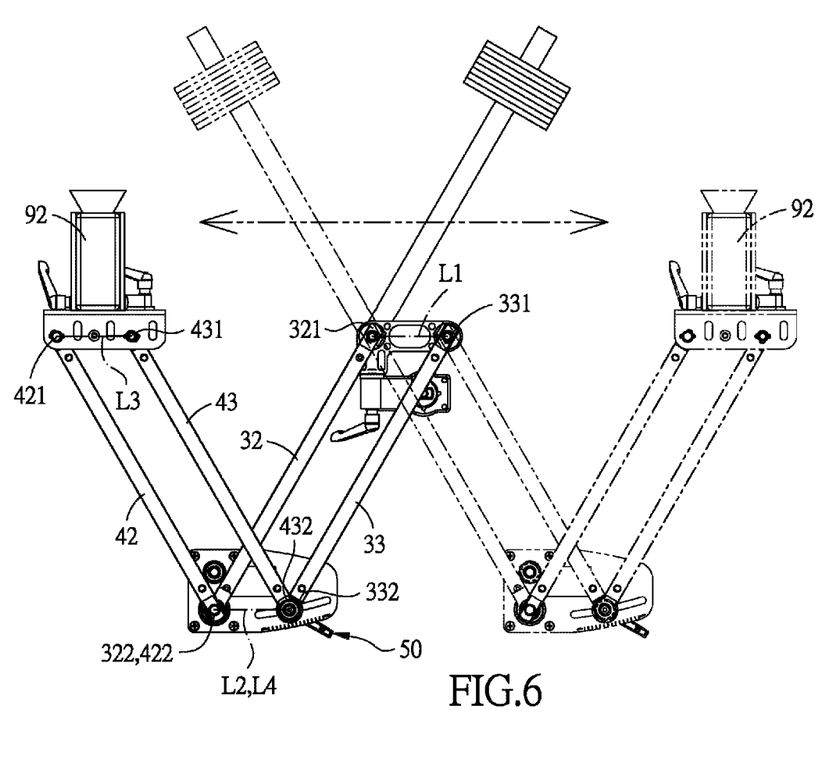
FIG. 6 is a top view of the invention, showing that the first adjustment portion of the first adjustment arm and the second adjustment portion of the second adjustment arm are in the straight line position.

As shown in FIGS. 3 and 6, when the user uses the adjustment unit 50 to adjust the first adjustment portion 332 of the first adjustment arm 33 and the second adjustment portion 432 of the second adjustment arm 43 to the straight line position, the distance L1 between the first connecting portion 321 of the first connecting arm 32 and the first pivoting portion 331 of the first adjustment arm 33 is equal to the distance L2 between the second connecting portion 322 of the first connecting arm 32 and the first adjustment portion 332 of the first adjustment arm 33, and the distance L3 between the third connecting portion 421 of the second connecting arm 42 and the second pivoting portion 431 of the second adjustment arm 43 is equal to the distance L4 between the fourth connecting portion 422 of the second connecting arm 42 and the second adjustment portion 432 of the second adjustment arm 43. At this moment, the first motion unit 30 and the second motion unit 40 form two parallelograms with respect to the connecting seat 20, and the long sides of the two parallelograms have the same length (the distance between two short sides of one parallelogram is equal to that of another parallelogram), so that the present invention can carry the object 92 to perform straight-line displacement.

Figure 7B:
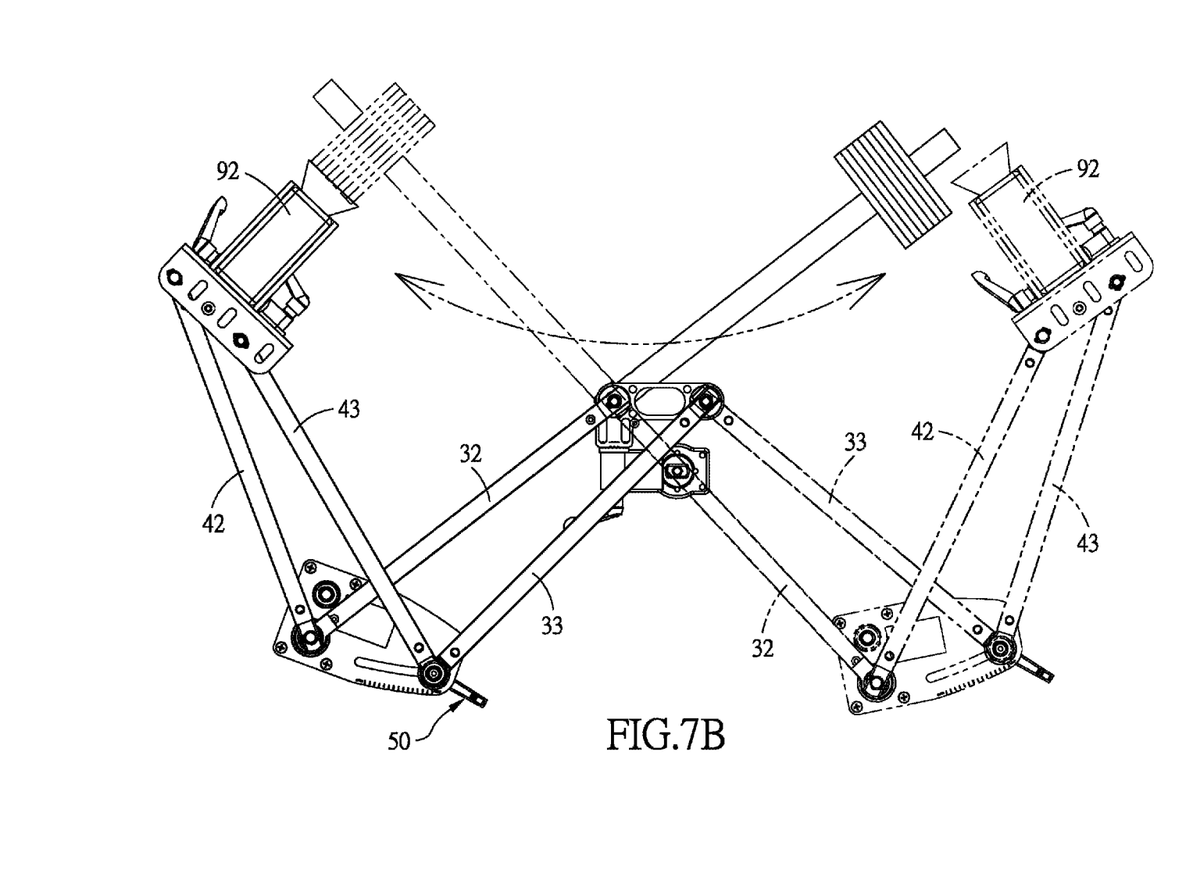
FIG. 7B is another top view of the invention, showing that the first adjustment portion of the first adjustment arm and the second adjustment portion of the second adjustment arm are in the outward curvature position.

As shown in FIGS. 7A and 7B, when the user uses the adjustment unit 50 to adjust the first adjustment portion 332 of the first adjustment arm 33 and the second adjustment portion 432 of the second adjustment arm 43 to the outward curvature position, the distance L1 between the first connecting portion 321 of the first connecting arm 32 and the first pivoting portion 331 of the first adjustment arm 33 is smaller than the distance L2 between the second connecting portion 322 of the first connecting arm 32 and the first adjustment portion 332 of the first adjustment arm 33, and the distance L3 between the third connecting portion 421 of the second connecting arm 42 and the second pivoting portion 431 of the second adjustment arm 43 is smaller than the distance L4 between the fourth connecting portion 422 of the second connecting arm 42 and the second adjustment portion 432 of the second adjustment arm 43, at this moment, the present invention can carry the object 92 to perform outward curvature displacement.

Figure 8B:
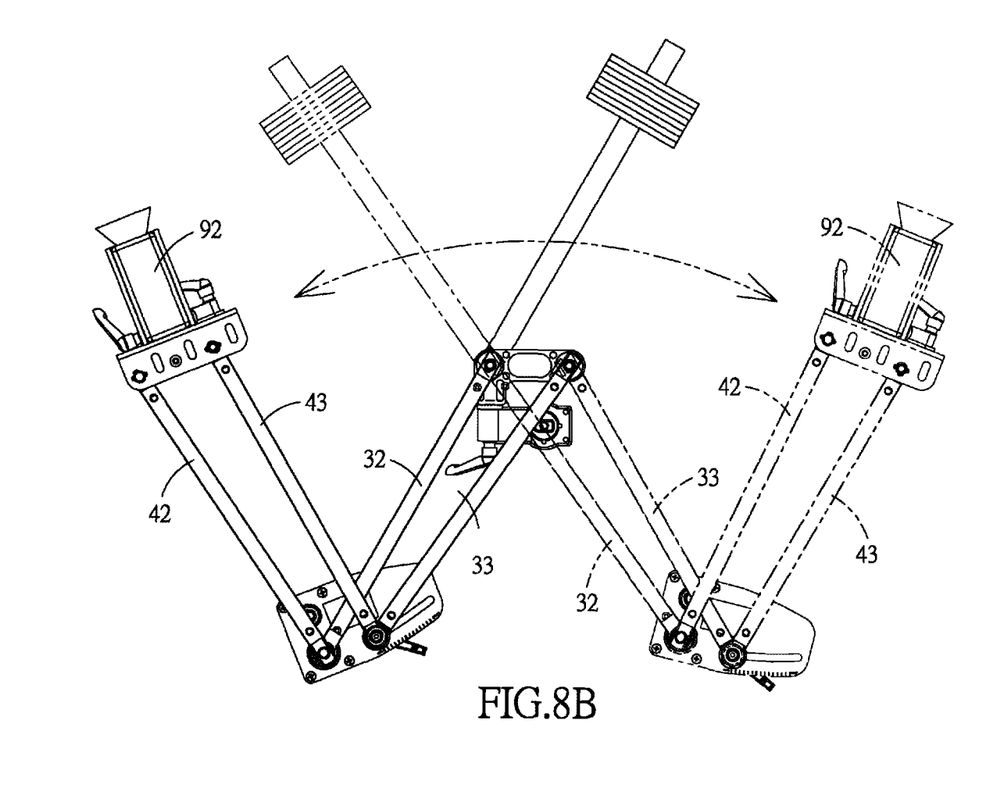
FIG. 8B is another top view of the invention, showing that the first adjustment portion of the first adjustment arm and the second adjustment portion of the second adjustment arm are in the inward curvature position.

As shown in FIGS. 8A and 8B, when the user uses the adjustment unit 50 to adjust the first adjustment portion 332 of the first adjustment arm 33 and the second adjustment portion 432 of the second adjustment arm 43 to the inward curvature position, the distance L1 between the first connecting portion 321 of the first connecting arm 32 and the first pivoting portion 331 of the first adjustment arm 33 is greater than the distance L2 between the second connecting portion 322 of the first connecting arm 32 and the first adjustment portion 332 of the first adjustment arm 33, and the distance L3 between the third connecting portion 421 of the second connecting arm 42 and the second pivoting portion 431 of the second adjustment arm 43 is greater than the distance L4 between the fourth connecting portion 422 of the second connecting arm 42 and the second adjustment portion 432 of the second adjustment arm 43, at this moment, the present invention can carry the object 92 to perform inward curvature displacement.

The adjustment unit 50 is disposed on the connecting seat 20, and the second connecting portion 322 of the first connecting arm 32 and the fourth connecting portion 422 of the second connecting arm 42 are disposed at the same position, the first adjustment portion 332 of the first adjustment arm 33 and the second adjustment portion 432 of the second adjustment arm 43 are also located at the same position and are simultaneously moved by the adjustment unit 50. Therefore, when adjust the position of the adjustment unit 50 on the connecting seat 20, the relative position between the first adjustment arm 33 and the first connecting arm 32, and the relative position between the second adjustment arm 43 and the second connecting arm 42 are also simultaneously adjusted. Hence, simply adjusting the adjustment unit 50 can simultaneously adjust the first adjustment portion 332 of the first adjustment arm 33 and the second adjustment portion 432 of the second adjustment arm 43 to the straight line position, the outward curvature position, or the inward curvature position, which make the adjustment convenient, and the displacement curvatures for moving the object 92 are asymmetrical (Namely, when the object 92 moves left and right, the left displacement curvature along which the object 92 moves leftward is symmetrical to the right displacement curvature along which the object 92 moves rightward).

While we have shown and described various embodiments in accordance with the present invention, it is clear to those skilled in the art that further embodiments may be made without departing from the scope of the present invention.

What is claimed is:

1. An object guide having a variable motion path, comprising:
    a connecting seat including a pivoting portion and a displacement slot;
    a first motion unit including a stationary seat, a first connecting arm and a first adjustment arm, the stationary seat including a first assembling portion and a second assembling portion, the first connecting arm being pivotally between the first assembling portion and the pivoting portion, the first adjustment arm including a first pivoting portion pivotally connected to the second assembling portion, and a first adjustment portion movably disposed in the displacement slot, wherein the first adjustment portion is movable among a straight line position, an outward curvature position and an inward curvature position;
    a second motion unit including a carrying seat, a second connecting arm and a second adjustment arm, wherein the carrying seat includes a third assembling portion and a fourth assembling portion, the second connecting arm is pivotally connected between the third assembling portion and the second connecting portion, the second connecting arm and the first connecting arm rotate in opposite directions, the second adjustment arm includes a second pivoting portion pivotally connected to the fourth assembling portion, and a second adjustment portion pivotally connected to the first adjustment portion, the second adjustment portion and the first adjustment portion rotate in opposite directions, so that the second adjustment portion is able to move along with the first adjustment portion among the straight line position, the outward curvature position and the inward curvature position; and
    an adjustment unit connected to the displacement slot of the connecting seat, the first adjustment portion of the first adjustment arm and the second adjustment portion of the second adjustment arm, to adjust positions of the first and second adjustment portions and to fix the first and second adjustment portions after adjustment.

2. The object guide as claimed in claim 1, wherein the displacement slot is arc-shaped.

3. The object guide as claimed in claim 1, wherein the adjustment unit further includes a fastening seat, a connecting shaft and a rotary member, the fastening seat includes an extension portion inserted in the displacement slot of the connecting seat, and a seat portion connected to the extension portion and pressed against one edge of the displacement slot, the connecting shaft is inserted in the fastening seat and includes a threaded hole, and is provided for pivotal mounting of the first adjustment portion of the first adjustment arm and the second adjustment portion of the second adjustment arm, the rotary member includes a threaded shaft inserted in the displacement slot and screwed in the threaded hole, a shoulder portion connected to the threaded shaft and pressed against another opposite edge of the displacement slot, and a rotary handle connected to the shoulder portion.

4. The object guide as claimed in claim 1, wherein the first connecting arm includes a first connecting portion pivotally connected to the first assembling portion, and a second connecting portion pivotally connected to the pivoting portion, and the second connecting arm includes a third connecting portion pivotally connected to the third assembling portion, and a fourth connecting portion pivotally connected to the second connecting portion.

5. The object guide as claimed in claim 4 further comprising a drive unit which is disposed on the connecting seat, and includes a drive shaft for connecting the second connecting portion of the first connecting arm and the fourth connecting portion of the second connecting arm.

6. The object guide as claimed in claim 4, wherein when the first adjustment portion and the second adjustment portion are in the straight line position, a distance between the first connecting portion of the first connecting arm and the first pivoting portion of the first adjustment arm is equal to a distance between the second connecting portion of the first connecting arm and the first adjustment portion of the first adjustment arm, and a distance between the third connecting portion of the second connecting arm and the second pivoting portion of the second adjustment arm is equal to a distance between the fourth connecting portion of the second connecting arm and the second adjustment portion of the second adjustment arm;
    when the first adjustment portion of the first adjustment arm and the second adjustment portion of the second adjustment arm are in the outward curvature position, the distance between the first connecting portion of the first connecting arm and the first pivoting portion of the first adjustment arm is smaller than the distance between the second connecting portion of the first connecting arm and the first adjustment portion of the first adjustment arm, and the distance between the third connecting portion of the second connecting arm and the second pivoting portion of the second adjustment arm is smaller than the distance between the fourth connecting portion of the second connecting arm and the second adjustment portion of the second adjustment arm;
    when the first adjustment portion of the first adjustment arm and the second adjustment portion of the second adjustment arm are in the inward curvature position, the distance between the first connecting portion of the first connecting arm and the first pivoting portion of the first adjustment arm is greater than the distance between the second connecting portion of the first connecting arm and the first adjustment portion of the first adjustment arm, and the distance between the third connecting portion of the second connecting arm and the second pivoting portion of the second adjustment arm is greater than the distance between the fourth connecting portion of the second connecting arm and the second adjustment portion of the second adjustment arm.

\* \* \* \* \*